United States Patent
Takemura et al.

(10) Patent No.: US 7,090,235 B2
(45) Date of Patent: Aug. 15, 2006

(54) STRUCTURE FOR MOUNTING FRONT FENDER

(75) Inventors: Hiroo Takemura, Wako (JP); Shunichi Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 10/788,773

(22) Filed: Feb. 27, 2004

(65) Prior Publication Data
US 2004/0212169 A1 Oct. 28, 2004

(30) Foreign Application Priority Data
Mar. 14, 2003 (JP) ............... 2003-070229

(51) Int. Cl.
*B62D 25/18* (2006.01)
(52) U.S. Cl. ............... 280/152.2; 280/854; 280/152.1; 280/852; 280/160.1; 280/288.4; 180/219
(58) Field of Classification Search ............. 280/152.1, 280/152.2, 152.3, 160.1, 159, 160, 156, 157, 280/847, 848, 851, 852, 277, 854, 288.4; 180/219–231, 84; 293/1, 105, 112; D12/114, D12/118, 126
See application file for complete search history.

(56) References Cited

U.S. PATENT DOCUMENTS

| | | | | |
|---|---|---|---|---|
| 2,510,222 A | * | 6/1950 | Harley | ............ 280/152.1 |
| 4,005,874 A | * | 2/1977 | Ohtani | ............ 280/288.4 |
| 4,458,909 A | * | 7/1984 | Morioka | ............ 280/279 |
| 5,098,765 A | * | 3/1992 | Bien | ............ 428/134 |
| D328,441 S | * | 8/1992 | Tsuyama | ............ D10/111 |
| 5,323,869 A | * | 6/1994 | Kurayoshi et al. | ............ 180/219 |
| 6,073,948 A | * | 6/2000 | Motojima et al. | ....... 280/152.2 |
| 6,257,362 B1 | | 7/2001 | Scherbarth | |
| 6,557,876 B1 | * | 5/2003 | Saiki et al. | ............ 280/152.1 |

FOREIGN PATENT DOCUMENTS

| | | | |
|---|---|---|---|
| JP | 60176873 | * | 9/1985 |
| JP | 62101592 | * | 5/1987 |
| JP | 62-166183 | | 10/1987 |
| JP | 2299993 | * | 12/1990 |
| JP | 5105151 | * | 4/1993 |
| JP | 7117756 | * | 5/1995 |

OTHER PUBLICATIONS

1985 Yamaha V-Max 1200NC, parts catalog[online]☐☐Yamaha Motor Corporation, U.S.A, 1996-2005 [retrieved on 2005-09-229]☐☐Retrieved from the Internet: <URL : http://www.yamaha-motor.com/sport/parts/home.aspx>.*

* cited by examiner

*Primary Examiner*—Christopher P. Ellis
*Assistant Examiner*—Vaughn Coolman
(74) *Attorney, Agent, or Firm*—Hamre, Schumann, Mueller & Larson, PC

(57) ABSTRACT

A structure for mounting a front fender that can enhance rigidity of a fin without unduly increasing the thickness of the fin or decreasing the slope of the fin. In one example structure for mounting a front fender, a fin of a front fender is mounted on a fin mounting portion formed in a front fork with a bolt, and a holding member is fastened to the fin mounting portion, together with the fin 55, with the bolt. A tip portion of the holding member is extended to a position separate from the fin mounting portion to support the reverse surface of the fin.

21 Claims, 4 Drawing Sheets

STRUCTURE FOR MOUNTING FRONT FENDER

TECHNICAL FIELD

This invention relates to a structure for mounting the front fender of a motorcycle or the like.

BACKGROUND

Motorcycles including a fin provided on a front fender that surrounds a front fork to enhance aerodynamic characteristics are known. See, for example, Japanese Unexamined Utility Model Publication No. 62-166183.

However, in the above prior art, such a fin receives the force of wind caused at the time when the motorcycle is running, so the fin needs to be increased in thickness so as to secure a measure of rigidity, or needs to be gently sloped so as to decrease the force of wind. As a result, the above prior art presents a problem in that the fin is limited in the shape to a large extent and hence is reduced in the degree of flexibility in design.

Therefore, it would be desirable to provide such a structure for mounting a front fender that can enhance the rigidity of the fin without increasing the thickness of the fin. It would also be desirable to provide such a structure without decreasing the slope of the fin, and which can result in an enhancement of the degree of flexibility in design.

SUMMARY

In order to solve one or more of the above problems, aspects of the present invention can include a structure for mounting a front fender, of the type in which a front fender is mounted on a front fender mounting portion formed in a front fork with a fastening member, where a holding member is fastened to the front fender mounting portion together with the front fender with the fastening member, and that the tip portion of the holding member is extended to a position separate from the front fender mounting portion to support the reverse surface of the front fender.

In this configuration, the tip portion of the holding member mounted on the front fender mounting portion, having high supporting rigidity, can preferably support the reverse surface of the front fender, which is separate from the front fender mounting portion, and provide the front fender with surface rigidity.

In accordance with another aspect, the holding member is interposed between the front fender mounting portion and the front fender. With this construction, the holding member can preferably be disposed close to the front fender.

In accordance with another aspect, the holding member is preferably disposed inside the front fender mounting portion. With this construction, the holding member can also function as a protector that protects a portion for mounting the front fork and the front fender mounting portion from jumping stones or the like.

In accordance with another aspect, an elastic body is preferably interposed between the tip portion of the holding member and the reverse surface of the front fender. This construction can preferably absorb the load applied to the front fender and provide the front fender with rigidity.

In accordance with another aspect, the front fender and the holding member are preferably mounted on the front fender mounting portion with the fastening member via an elastic member. This construction can provide the front fender mounting portion with flexibility.

DETAILED DESCRIPTION

Figure 1:
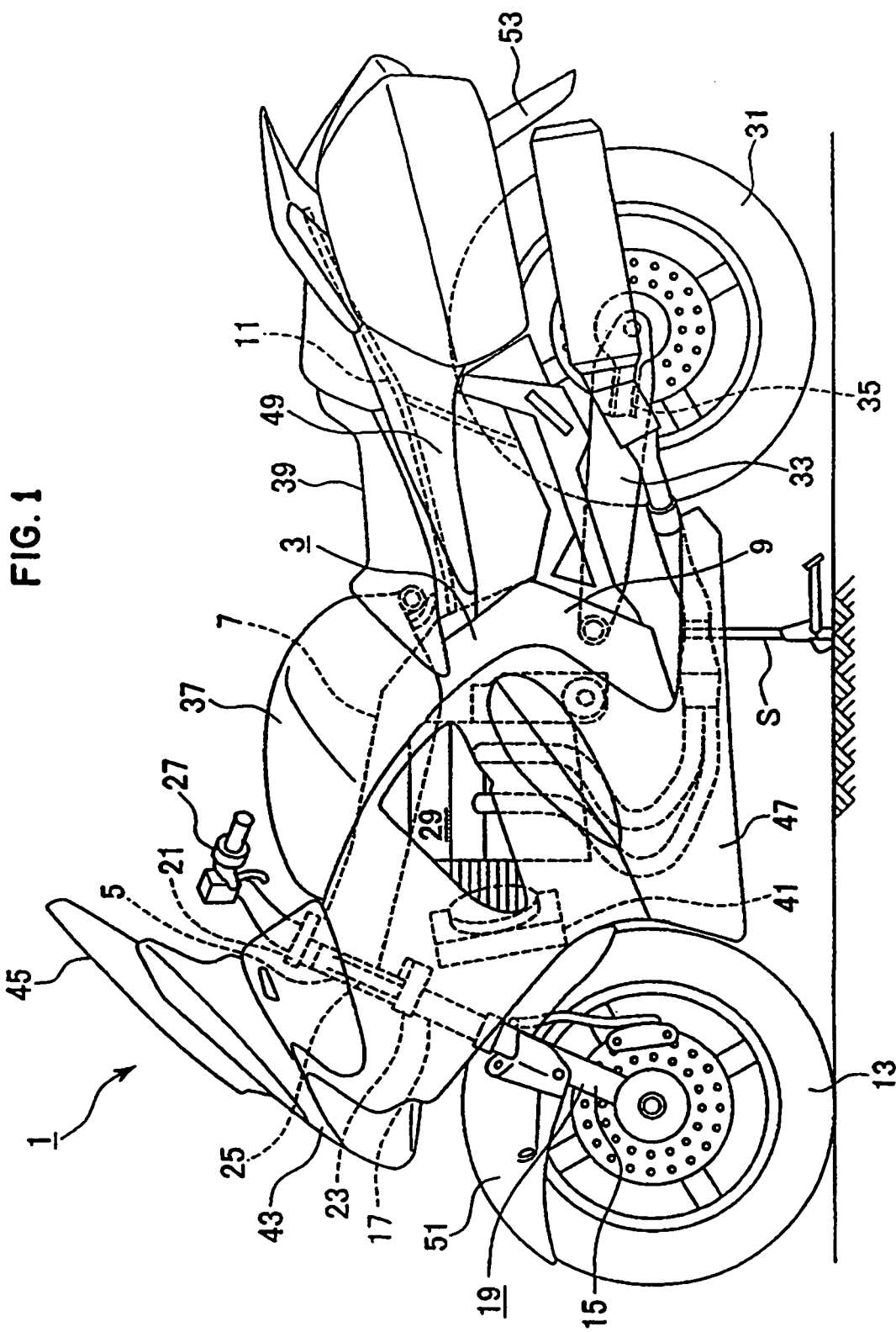
FIG. 1 is a side view of a motorcycle in accordance with a first embodiment of this invention.
Figure 2:
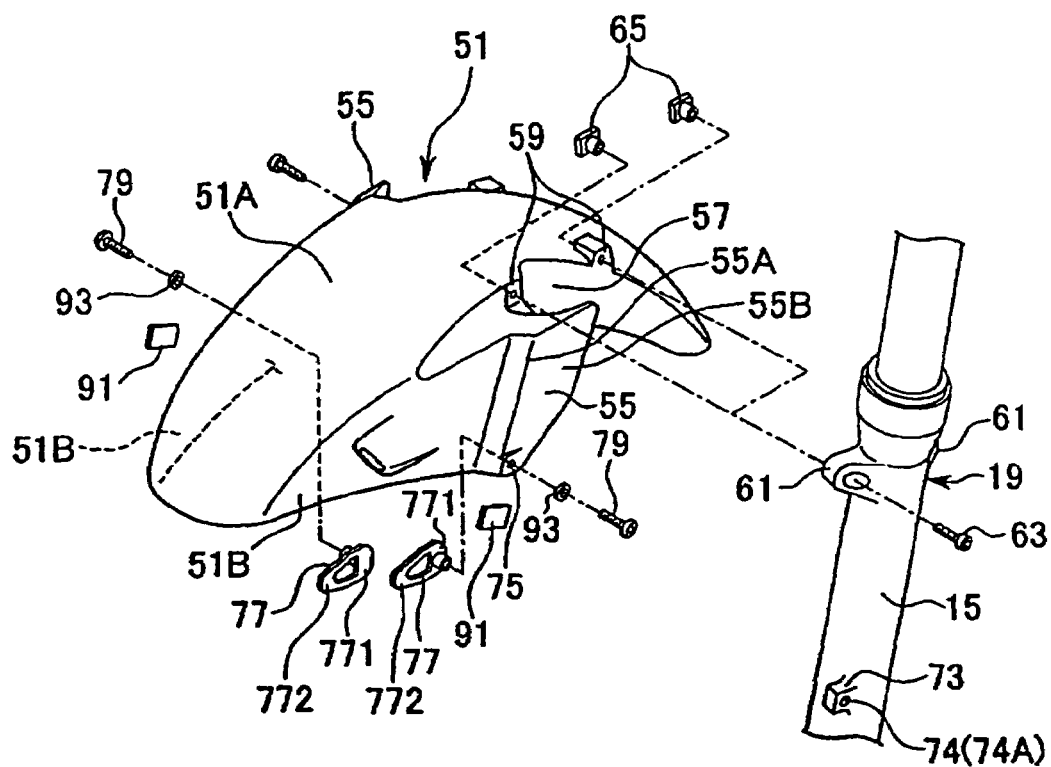
FIG. 2 is a partial perspective view of the main portion of the first embodiment of FIG. 1.
Figure 3:
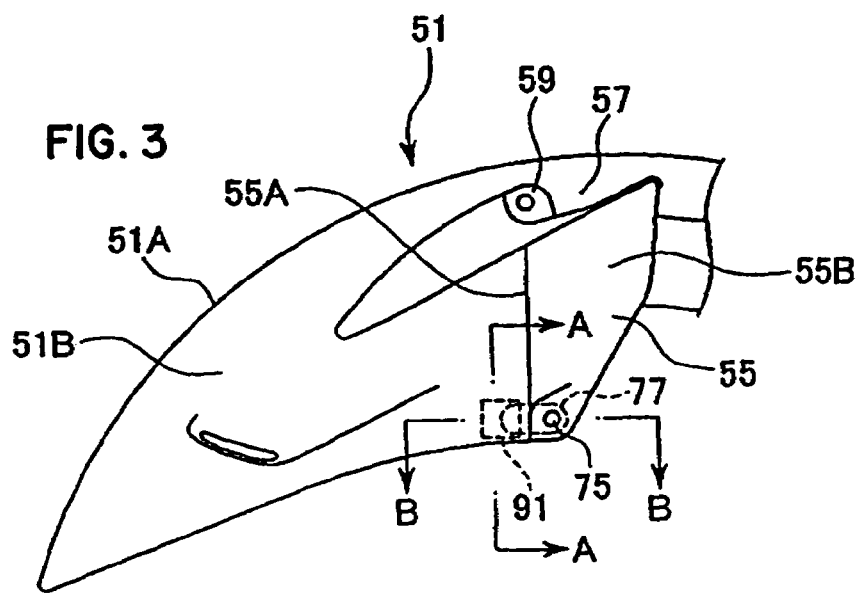
FIG. 3 is a partial side view of a front fender in accordance with the first embodiment of FIG. 1.
Figure 4:
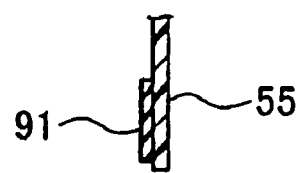
FIG. 4 is a cross-sectional view taken along a line A—A in FIG. 3.

A first embodiment of this invention will be hereinafter described with reference to the drawings. FIG. 1 is a side view of a motorcycle 1. The vehicle frame 3 of motorcycle 1 is provided with a head tube 5, a main tube 7 extending backward in a slanting direction from the head tube 5, a center tube 9 extending downward from the rear end of the main tube 7, and a seat rail 11 extending backward from the main tube 7. FIG. 1 shows a state where a vehicle body of motorcycle 1 is supported by a center stand S.

A front wheel 13 is suspended by left and right front forks 19, each of which is constructed of an outer case 15 and an inner case 17. The top of each inner case 17 is supported by a top bridge 21 and a bottom bridge 23. A steering stem 25, passed through the head tube 5, is joined to the top bridge 21 and the bottom bridge 23. The front wheel 13 is steered by a handlebar 27 fixed to the top bridge 21.

An engine 29 is supported by the main tube 7 and the center tube 9, and a rear wheel 31 is supported by rear forks 33 and is driven by engine power via a drive shaft 35.

A fuel tank 37 is mounted over the main tube 7, a seat 39 is arranged on the seat rail 11, and a radiator 41 is arranged forward in a slanting direction of the engine 29 and backward of the front forks 19.

In the illustrated embodiment, motorcycle 1 is a full-cowling type motor cycle provided with a front cowl 43 covering the front portion of the vehicle body, a wind screen 45 mounted on the top of the front cowl 43, a side cowl 47 covering the sides of the vehicle body, a seat cowl 49 covering the bottom of the seat 39, a front fender 51 covering the top of the front wheel 13, and a rear fender 53 covering the top of the rear wheel 31.

As shown in FIG. 2 to FIG. 6, the front fender 51 is formed of a top surface portion 51A that faces the outer peripheral surface of the front wheel 13 and is formed in a curved surface, and left and right side surface portions 51B that face the outer peripheral side surfaces of the front wheel 13. The front half of each of the side surface portions 51B has a fin (front fender) 55 that gradually expands outward in the direction of vehicle width from the front side and covers the front surface and the side surface of the outer case 15 of the front fork 19 (only left side is shown in the drawing).

In the fin 55, a bottom rear edge is formed so as to descend forward in a slanting direction, and a portion in the rear of a bend line portion 55A along a vertical direction is formed in a nearly flat shape. A mounting hole 75 is formed in the lower portion of this flat portion 55B.

A receiving portion 57 that receives the outer case 15 is formed between the side surface portion 51B and the fin 55. Two mounting seats 59 are formed on the side surface portion 51B of the front fender 51 above the receiving portion 57, and a mounting flange portion 61 formed on the outer case 15 is fastened and fixed to these mounting seats 59 with bolts 63 and nuts 65.

A portion (front fender mounting portion) 73 for mounting the fin of the front fender 51 is formed below a mounting flange portion 61 on the front side of the outer case 15. This fin mounting portion 73 is formed at a position corresponding to the mounting hole 75 formed in the lower portion of the fin 55.

The base portion 771 of a holding member 77 is fastened to the fin mounting portion 73 together with the fin 55 of the front fender 51 with a bolt (fastening member) 79 and the tip portion 772 of this holding member 77 is extended to a position separate from the fin mounting portion 73, specifically, across and forward of the bend line portion 55A of the fin 55 to support the reverse surface of the front fender 51, that is, the reverse surface of the fin 55.

Figure 5:
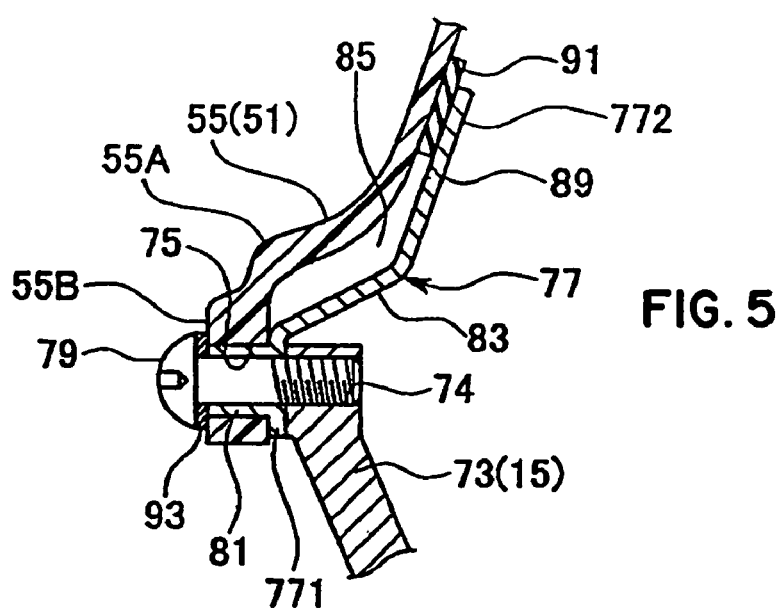
FIG. 5 is a cross-sectional view taken along a line B—B in FIG. 3.
Figure 6:
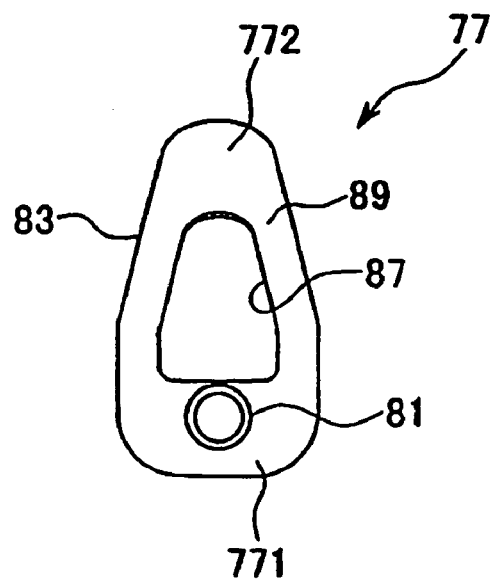
FIG. 6 is a plan view of an embodiment of a holding member in accordance with this invention.

As shown in FIG. 5 and FIG. 6, the holding member 77 is a metal member constructed of a collar portion 81 and an elastic portion 83. The collar portion 81 is a portion that is formed at the base portion 771 of the elastic portion 81 and through which the bolt 79 is passed and then passed through the mounting hole 75 of the front fender 51 from inside.

The elastic portion 83 is a portion that is provided with the collar portion 81 at the base portion 771 and is tapered toward the tip portion 772 to enhance an elastic effect, and has an opening 87 for reducing its weight. This elastic portion 83 is extended along the shape of the fin 55 of the front fender 51 from the mounting surface of the collar portion 81 and is more curved inward, as it extends closer to the front side, and has a flat portion 89 which faces inside in a slating direction and is suitable for face contact on the tip portion 772 side. A space 85 (see FIG. 5) that allows the front fender 51 to move inward is formed between the front fender 51 and the holding member 77.

Therefore, the collar portion 81 of the holding member 77 is inserted through the mounting hole 75 of the fin 55 such that the base portion 771 of the holding member 77 is sandwiched between the fin mounting portion 73 of the outer case 15 and the front fender 51. The bolt 79 is passed through the mounting hole 75 of the fin 55 and the collar portion 81 of the holding member 77 and is screwed into and fixed to the female threaded portion 74 of the fin mounting portion 73 of the outer case 15.

A rubber plate (elastic body) 91 is interposed between the tip portion 772 of the holding member 77 and the reverse surface of the front fender 51. This rubber plate 91 is sandwiched between the flat portion 89 of the holding member 77 and the reverse surface of the front fender 51.

Further, the front fender 51 and the holding member 77 are fastened to the fin mounting portion 73 of the outer case 15 with the bolt 79 via a rubber washer (elastic member) 93.

According to the above embodiment, the tip portion 772 of the holding member 77 mounted on the fin mounting portion 73 of the outer case 15, having high supporting rigidity, supports the reverse surface of the front fender 51, specifically, the reverse surface of the fin 55, which is separate from the fin mounting portion 73, to provide the fin 55 with surface rigidity. Hence, the thickness of the front fender 51 can be reduced, especially the fin 55. Further, the degree of flexibility in molding and the degree of flexibility in design is enhanced. Therefore, even if the fin 55 does not have a gentle slope, the fin 55 can exhibit preferable aerodynamic characteristics.

In other words, a force which is effected by wind caused at the time when the motorcycle 1 is moving applies a large stress to the bend line portion 55A of the fin 55. However, the holding member 77 mounted across the bend line portion 55A can receive the load applied thereto by the wind, so the load applied to the bend line portion 55A can be reduced. As a result, the fin 55 can be reduced in thickness and can be formed in an optimum shape.

Since the holding member 77 is interposed between the outer case 15 of the front fork 19 and the fin 55 of the front fender 51, the holding member 77 can be disposed close to the front fender 51, thereby enhancing rigidity in the vicinity of the mounting portion of the front fender 51, specifically, around the mounting hole 75.

Further, since the rubber plate 91 is interposed between the flat portion 89 of the holding member 77 and the reverse surface of the fin 55 of the front fender 51, the rubber plate 91 can softly absorb the load applied to the fin 55 of the front fender 51 and provide the front fender 51 with rigidity and support.

Still further, since the fin 55 of the front fender 51 and the holding member 77 are fastened to the fin mounting portion 73 of the outer case 15 with the bolt 79 via the rubber washer 93, the fin mounting portion 73 can be provided with flexibility. Therefore, the load applied to the fin 55 of the front fender 51 can be absorbed, and the fin 55 itself and the front fender 51 can be provided with rigidity by the holding member 77.

Figure 7:
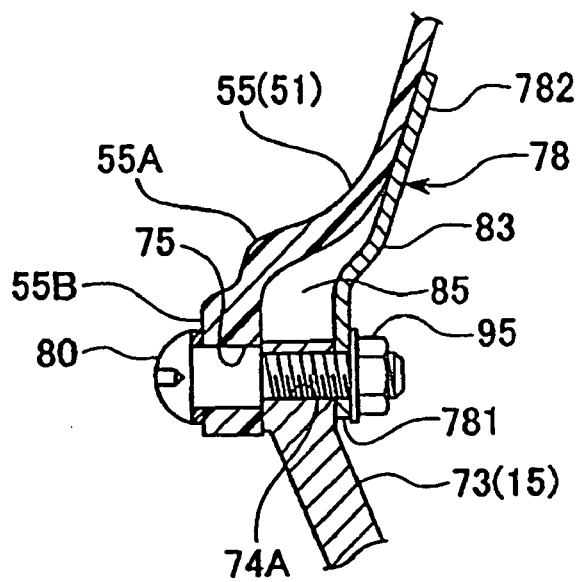
FIG. 7 is a cross-sectional view corresponding to FIG. 5 of a second embodiment of this invention.

Next, a second embodiment of this invention will be described with reference to FIG. 7. Here, the description will be given with the same portions as in the first embodiment denoted by the same reference numerals.

In this embodiment, a holding member 78 is arranged inside the outer case 15 of the front fork 19. In other words, in this embodiment, a stepped bolt 80 is used in place of the bolt 79 in the first embodiment and the holding member 78 is arranged inside the fin mounting portion 73 of the outer case 15 and is fastened with a nut 95, whereby the holding member 78 is fixed to the fin mounting portion 73 of the outer case 15. Also in this embodiment, the base portion 781 of the holding member 78 is fixed to the fin mounting portion 73, and the tip portion 782 thereof is extended forward to abut against the reverse surface of the fin 55 of the front fender 51 to support the fin 55 from the reverse surface side. In this embodiment, a through hole 74A is formed in the fin mounting portion 73.

Therefore, according to this embodiment, the holding member 78 can provide the fin 55 with surface rigidity, so that the front fender 51, especially the fin 55, can be reduced in thickness, which can enhance the degree of flexibility in molding and the degree of flexibility in design. In addition, since the holding member 78 is located inside the fin mounting portion 73, the holding member 78 can reduce the possibility for stones or the like being propelled toward portions around the through hole 74A of the fin mounting portion 73 of the outer case 15 and the mounting hole 75 of the fin 55 to prevent the portions from being dented or flawed. Hence, this embodiment is advantageous in that the holding member 78 also function as a protector.

Although the separate nut 95 is used in this embodiment, the nut can be replaced with a welded nut in which the nut 95 is welded to the holding member 78. Further, it is also recommended that the base portion 781 of the holding member 78 be provided with a collar portion, as is the case with the first embodiment, and that the collar portion be passed through the through hole 74A of the fin mounting portion 73 of the outer case 15.

Figure 8:
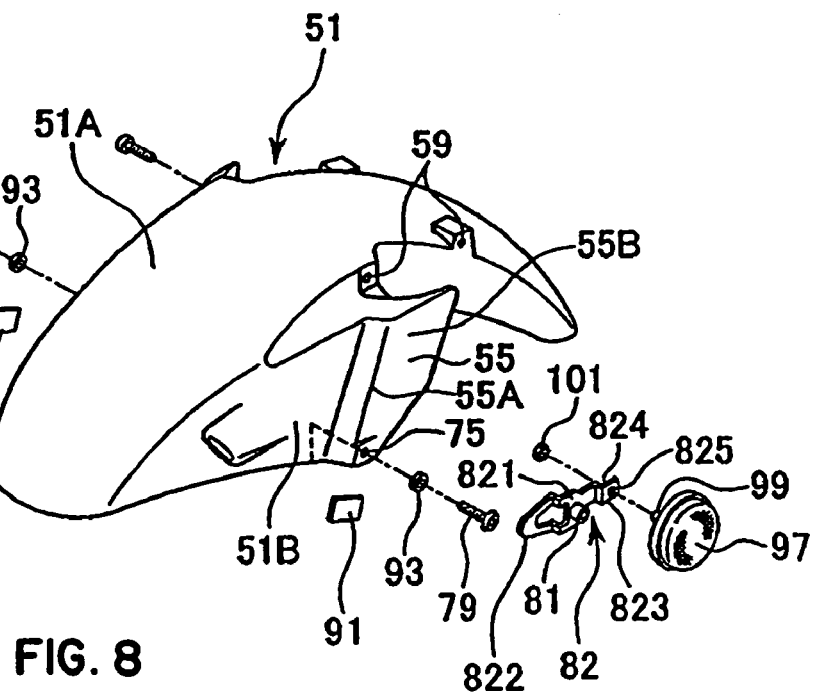
FIG. 8 is a partial perspective view of the main portion of a third embodiment of this invention.

Next, a third embodiment of this invention will be described with reference to FIG. 8.

In this embodiment, a holding member 82 (similar to the holding member 77 of the first embodiment, see FIG. 1 to FIG. 6) is effectively utilized as a member for mounting a reflector. The holding member 82 of this embodiment, as in the case of the first embodiment, has a base portion 821 having the collar portion 81, a tip portion 822 for supporting the reverse surface of the fin 55 via the rubber plate 91, and a portion 823 for mounting a reflector 97 that extends backward from the opposite side of the tip portion 822, specifically, from the base portion 821.

Also in this embodiment, the holding member 82 is mounted between the fin mounting portion 73 of the outer case 15 and the fin 55 with the bolt 79 via the rubber washer 93.

The portion 823 for mounting the reflector 97 is provided with a stepped portion 824 extending backward from a bottom rear edge of the fin 55 that is cut forward in a slanting direction and rises outward, and a hole 825 for mounting the reflector 97 is formed in the tip portion of the stepped portion 824. Therefore, a bolt 99 for mounting the reflector 97 is passed through the hole 825 from outside and the reflector 97 is fastened with a nut 101 from inside, whereby the reflector 97 is fixed to the holding member 82.

Hence, according to this embodiment, in addition to the effects of the first embodiment, the holding member 82 can be effectively utilized as the member for mounting the reflector 97, so that the parts to be assembled can be reduced in number as compared with a case where another member is provided as the member for mounting the reflector 97.

This invention is not limited to the above embodiments. For example, the holding member 77 of the first embodiment may be formed in a shape not having a hole 87. Moreover, the rubber plate 91 may be interposed between the tip portion 782 of the holding member 78 and the fin 55 in the second embodiment.

Further, in the illustrated embodiments if thickness of the fin of the front fender is increased so as to secure supporting rigidity, the degree of flexibility in molding can be limited to an extent. However, the invention can also be applied to a portion where the mounting flange portions 61 of the outer case 15 of the front fork 19 are mounted to the mounting seat 59 of the front fender 51.

What is claimed is:

1. A structure for mounting a front fender, comprising:
   a front fender that is coupled to a front fender mounting portion formed in a front fork with a fastening member; and
   a holding member having a collar portion and an elastic portion, wherein the collar portion is coupled to the front fender mounting portion and the front fender by the fastening member;
   wherein a tip portion of the holding member elastic portion is extended to a position separate from the front fender mounting portion such that only the tip portion is disposed against a reverse surface of the front fender to support the reverse surface of the front fender.

2. The structure for mounting a front fender as claimed in claim 1, wherein the holding member is interposed between the front fender mounting portion and the front fender.

3. The structure for mounting a front fender as claimed in claim 1, wherein the holding member is disposed inside the front fender mounting portion.

4. The structure for mounting a front fender as claimed in claim 1, wherein an elastic body is interposed between the tip portion of the holding member and the reverse surface of the front fender.

5. The structure for mounting a front fender as claimed in claim 1, wherein the front fender and the holding member are mounted an the front fender mounting portion with the fastening member via an elastic member.

6. The structure for mounting a front fender as claimed in claim 1, wherein the fastening member is a bolt.

7. The structure for mounting a front fender as claimed in claim 6, wherein the bolt is stepped.

8. The structure for mounting a front fender as claimed in claim 1, wherein the holding member further includes a portion for mounting a reflector.

9. The structure for mounting a front fender as claimed in claim 8, wherein the portion of the holding member for mounting the reflector extends backward from a side opposite to that of the tip portion.

10. The structure for mounting a front fender as claimed in claim 1, wherein a space is formed between the front fender arid the holding member.

11. A motorcycle, comprising:
    a vehicle frame including front forks;
    a front wheel suspended by the front forks;
    a front fender that is coupled to a front fender mounting portion formed in each respective front fork with a fastening member; and
    a holding member having a collar portion and an elastic portion, wherein the collar portion is coupled to the front fender mounting portion and the front fender by the fastening member;
    wherein a tip portion of the holding member elastic portion is extended to a position separate from the front fender mounting portion such that only the tin portion is disposed against a reverse surface of the front fender to support the reverse surface of the front fender.

12. The motorcycle as claimed in claim 11, wherein the holding member is interposed between the front fender mounting portion and the front fender.

13. The motorcycle as claimed in claim 11, wherein the balding member is disposed inside the front fender mounting portion.

14. The motorcycle as claimed in claim 11, wherein an elastic body is interposed between the tip portion of the holding member and the reverse surface of the front fender.

15. The motorcycle as claimed in claim 11, wherein the front fender and the holding member are mounted on the front fender mounting portion with the fastening member via an elastic member.

16. The motorcycle as claimed in claim 11, wherein the fastening member is a bolt.

17. The motorcycle as claimed in claim 16, wherein the bolt is stepped.

18. The motorcycle as claimed in claim 11, wherein the holding member further includes a portion for mounting a reflector.

19. The motorcycle as claimed in claim 18, wherein the portion of the holding member for mounting the reflector extends backward from a side opposite to that of the tip portion.

20. A method for mounting a front fender, comprising:
   providing a front fender that is coupled to a front fender mounting portion formed in a front fork with a fastening member;
   coupling a holding member that is coupled to the front fender mounting portion and the front fender using the fastening member; and
   allowing an elastic tip portion of tile holding member to extend to a position separate from the front fender mounting portion such that only the tip portion is disposed against a reverse surface of the front fender to support the reverse surface of the front fender.

21. The method as claimed in claim 20, further comprising interposing an elastic body between the tip portion of the holding member and the reverse surface of the front fender.

* * * * *